United States Patent
Cagney et al.

(10) Patent No.: US 6,853,957 B2
(45) Date of Patent: *Feb. 8, 2005

(54) DATE AND TIME PROCESSING IN COMPUTERS

(75) Inventors: Austin Cagney, Dublin (IE); David McCormack, Dublin (IE); Ian Pepper, Dublin (IE)

(73) Assignee: Automsoft R & D Limited, Dublin (IE)

(*) Notice: Subject to any disclaimer, the term of this patent is extended or adjusted under 35 U.S.C. 154(b) by 23 days.

This patent is subject to a terminal disclaimer.

(21) Appl. No.: 10/300,804

(22) Filed: Nov. 21, 2002

(65) Prior Publication Data

US 2003/0097432 A1 May 22, 2003

(30) Foreign Application Priority Data

Nov. 21, 2001 (IE) ........................................... 2001/1001

(51) Int. Cl.[7] ............................................... G06F 15/00
(52) U.S. Cl. ..................... 702/187; 702/79; 702/176; 702/178; 702/187; 714/20; 714/815; 368/46; 368/107; 700/14; 700/16; 341/122; 341/152
(58) Field of Search ..................... 702/79, 149, 176, 702/177, 178, 187, FOR 154; 714/20, 815; 368/46, 107; 700/14, 16, 72; 370/205, 213; 341/122, 152; 713/73

(56) References Cited

U.S. PATENT DOCUMENTS 5,315,566 A * 5/1994 Stein ............................ 368/46
5,933,625 A * 8/1999 Sugiyama ..................... 713/503

OTHER PUBLICATIONS

Daponte et al., 'Object–Oriented Design of Measurement Systems', Jan. 1992, IEEE, pp. 243–248.*

* cited by examiner

Primary Examiner—Patrick Assouad
Assistant Examiner—Elias Desta
(74) Attorney, Agent, or Firm—Jacobson Holman PLLC

(57) ABSTRACT

A process data capture and reporting system captures process data values at sensors. A client computer appends absolute-value time stamps to the values to complete records, which are uploaded to a server. The server writes the records to a persistent database. At a later stage, the server retrieves selected records, and performs a very fast conversion of the time stamps to a calendar format with "granular" values for units such as day, month, or minute. The conversion is performed in an optimised manner with use of look-up tables in memory. This minimises processor overhead, and is thus very advantageous where data volumes are high and/or near real time reporting is required.

15 Claims, 4 Drawing Sheets

DATE AND TIME PROCESSING IN COMPUTERS

FIELD OF THE INVENTION

The invention relates to processing of time and date data in data processing equipment.

PRIOR ART DISCUSSION

At present there are two time/date (henceforth "time") representation approaches in common use. One approach involves generating a data word representing time as an "absolute" value which is a count of intervals since a point in time. In a second, "granular", approach time is represented as a data word for each field for progressively smaller granularity: year, month, . . . milliseconds.

Examples of these two approaches are to be found in Windows™ operating systems, in which "FILETIME" uses the first approach and "SYSTEMTIME" uses the second approach.

The FILETIME representation of time is a signed 64-bit counter of 100 nanosecond intervals, using 1st Jan. 1601CE as the epoch. The FILETIME permits a very wide range of dates, 30000 years before and after the epoch, accurate to within +/−0.00000005 seconds. The FILTIME structure is represented (in the C programming language) as:

```
typedef struct _FILETIME {
  DWORD dwLowDateTime;
  DWORD dwHighDateTime;
} FILETIME, *PFILETTME, *LPFILETIME;
```

The SYSTEMTIME representation of time is a C programming language structure (see below) containing eight fields of granular values corresponding to the year, month, day, hour, minute, second, millisecond and day of the week. Each of the fields is an unsigned 16-bit integer. The SYSTEMTIME representation permits a very wide range of dates, from the year 0 to 65535CE inclusive, with an accuracy of +/−0.0005 seconds. The structure is as follows.

```
typedef struct _SYSTEMTIME {
  WORD wYear;
  WORD wMonth;
  WORD wDayOfWeek;
  WORD wDay;
  WORD wHour;
  WORD wMinute;
  WORD wSecond;
  WORD wMilliseconds;
} SYSTEMTIME, *PSYSTEMTIME, *LPSYSTEMTIME;
```

Because of its greater conciseness and higher accuracy relative to the SYSTEMTIME, the FILETIME is frequently used as a persisted time format in software systems (i.e. the format in which times are stored to secondary storage). For similar reasons, it is also widely used for the collection and exchange of scientific and engineering data. However, for processing and manipulation of times, including presentation to a human user, the SYSTEMTIME format is more commonly used because it has a direct mapping to real-world time.

It is therefore advantageous to have a mechanism available to the developer for conversion between the two different representations. Such a mechanism is provided on Windows™ operating systems as a standard part of the Win32™ API through the FileTimeToSystemTime( ) and SystemTimeToFileTime( ) functions. While this mechanism is effective, it suffers from the problem of being processor-intensive. This can be particularly problematic for data capture systems which capture large quantities of data in real time from environments such as production processes. In such an environment there are secondary storage aspects with high data volumes in real-time, and also processing and human output aspects.

The invention addresses this problem.

SUMMARY OF THE INVENTION

According to the invention, there is provided a data processing method carried out by a data processor connected to a memory, the method comprising the steps of:—

(a) receiving an input time value represented in an absolute format, (b) processing the input value to determine an index for a look-up table comprising entries of date or time period values, (c) retrieving from the look-up table a date or time period value corresponding to the index, and (d) determining from said period value an output value being a granular representation of the input value.

In one embodiment, the step (b) comprises generating a value for the number of periods elapsed since a start time, and using this value as the index.

In another embodiment, said index value is determined by:

(b1) determining an initial value for the number of low-granularity periods elapsed since the start time, and (b2) dividing said initial value to determine a number of higher-granularity periods elapsed since the start time.

In a further embodiment, the higher-granularity periods are days.

In one embodiment, the initial value represents the numbers of milliseconds elapsed since the start time.

In another embodiment, the look-up table entries span an optimised most-likely subset of the complete range of the absolute format, and the method is terminated before processing the input value if the input value falls outside of the optimised range.

In a further embodiment, the method normalises the input value to the start time of the optimised range before performing the step (b).

In another embodiment, the period value retrieved from the look-up table is a calendar date.

In a further embodiment, step (d) is repeated for each of a succession of decreasing granular values until a granular representation requirement is met.

In one embodiment, the potential successive granular values are year, month, day, hour, minutes, seconds, and milliseconds.

In another embodiment, the invention comprises the further steps of capturing process data, writing a record containing the process data and a time stamp in a universal format to a database, subsequently retrieving the record, and performing steps (a) to (d) to provide a granular-representation output value time stamp in which the universal format time stamp is the input value for the steps (a) to (d).

In one embodiment, the method comprises the further steps of processing the output value time stamp to generate a process report.

In one embodiment, the process data is captured from a manufacturing production line.

In another aspect, the invention provides a data processing system comprising means for performing a method as defined above.

DETAILED DESCRIPTION OF THE INVENTION

BRIEF DESCRIPTION OF THE DRAWINGS

The invention will be more clearly understood from the following description of some embodiments thereof, given by way of example only, with reference to the accompanying drawings in which.

DESCRIPTION OF THE EMBODIMENTS

Figure 1:
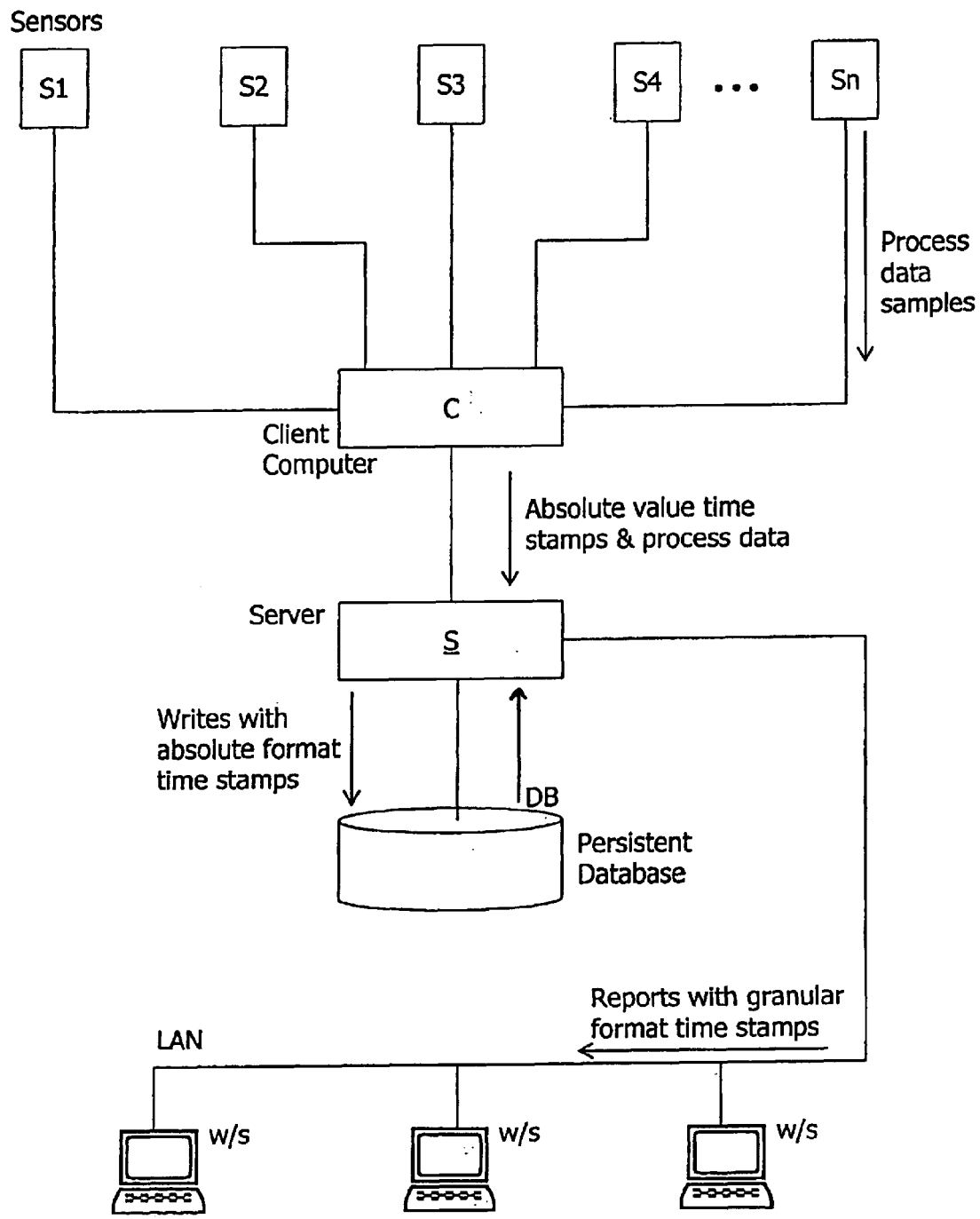
FIG. 1 is an illustration of a data capture and reporting system of the invention.
Figure 2A:
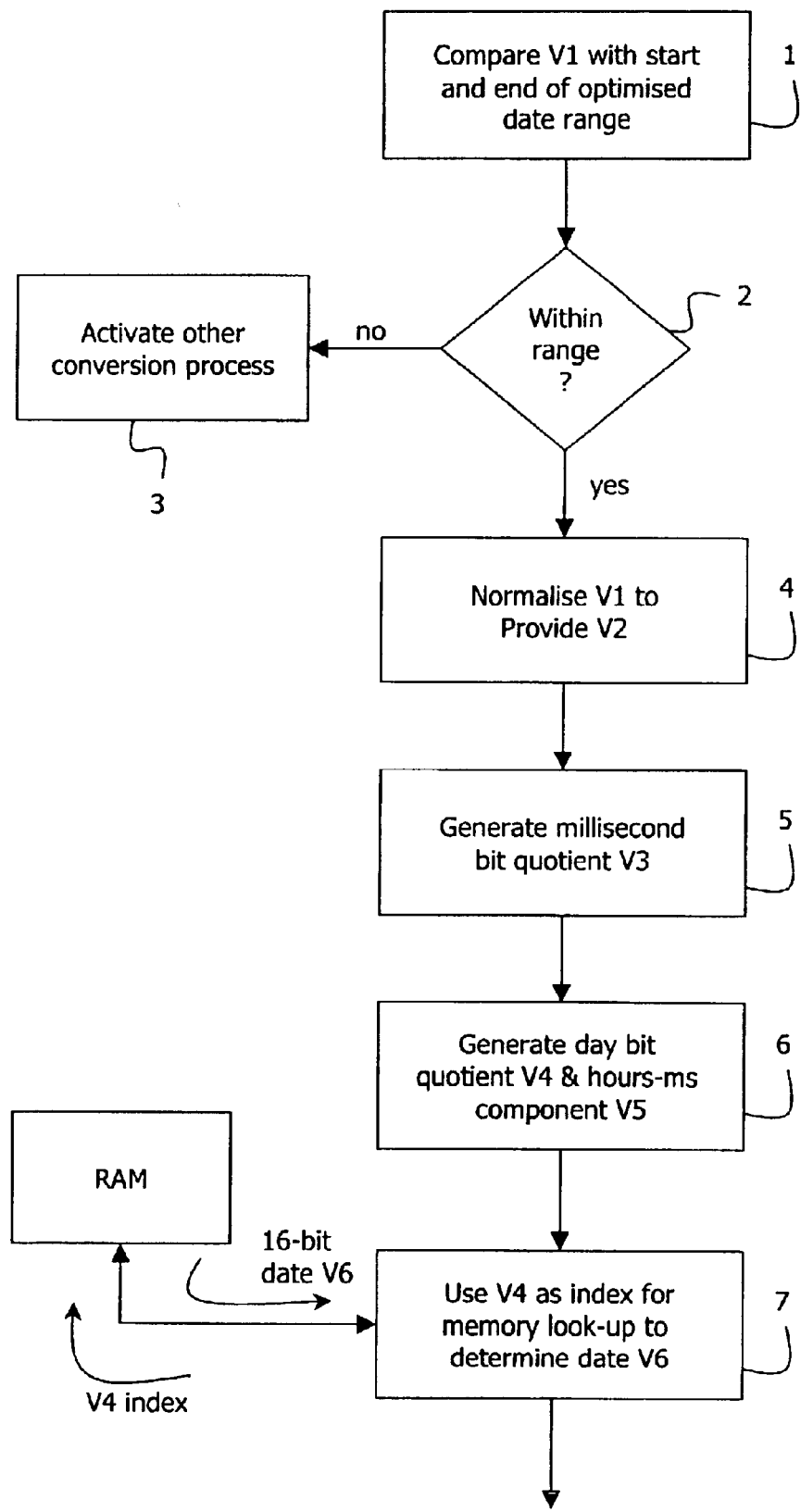
FIGS. 2(a) to 2(c) are together a flow diagram illustrating a time and date conversion process implemented by the system.
Figure 2B:
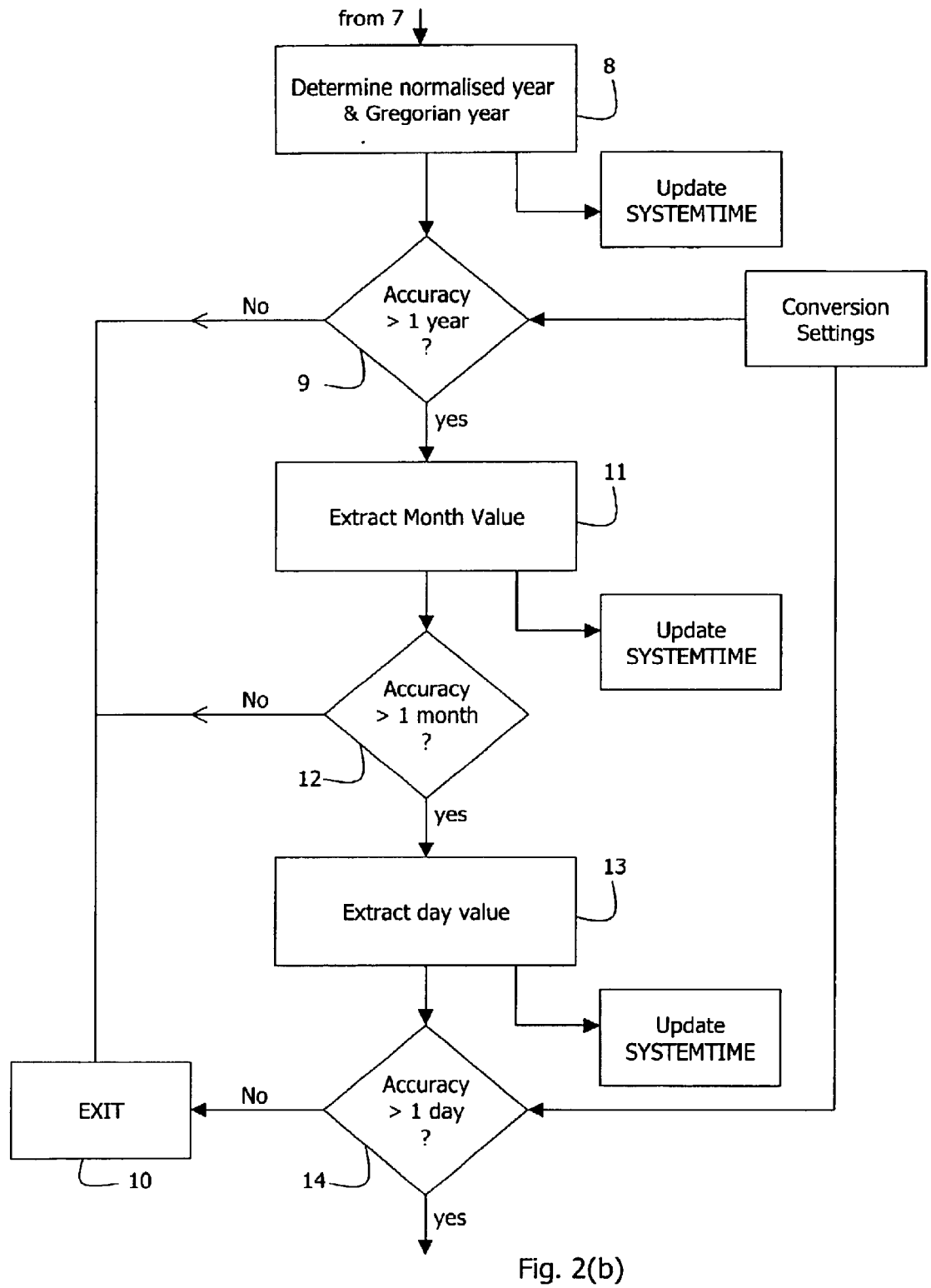
Figure 2C:
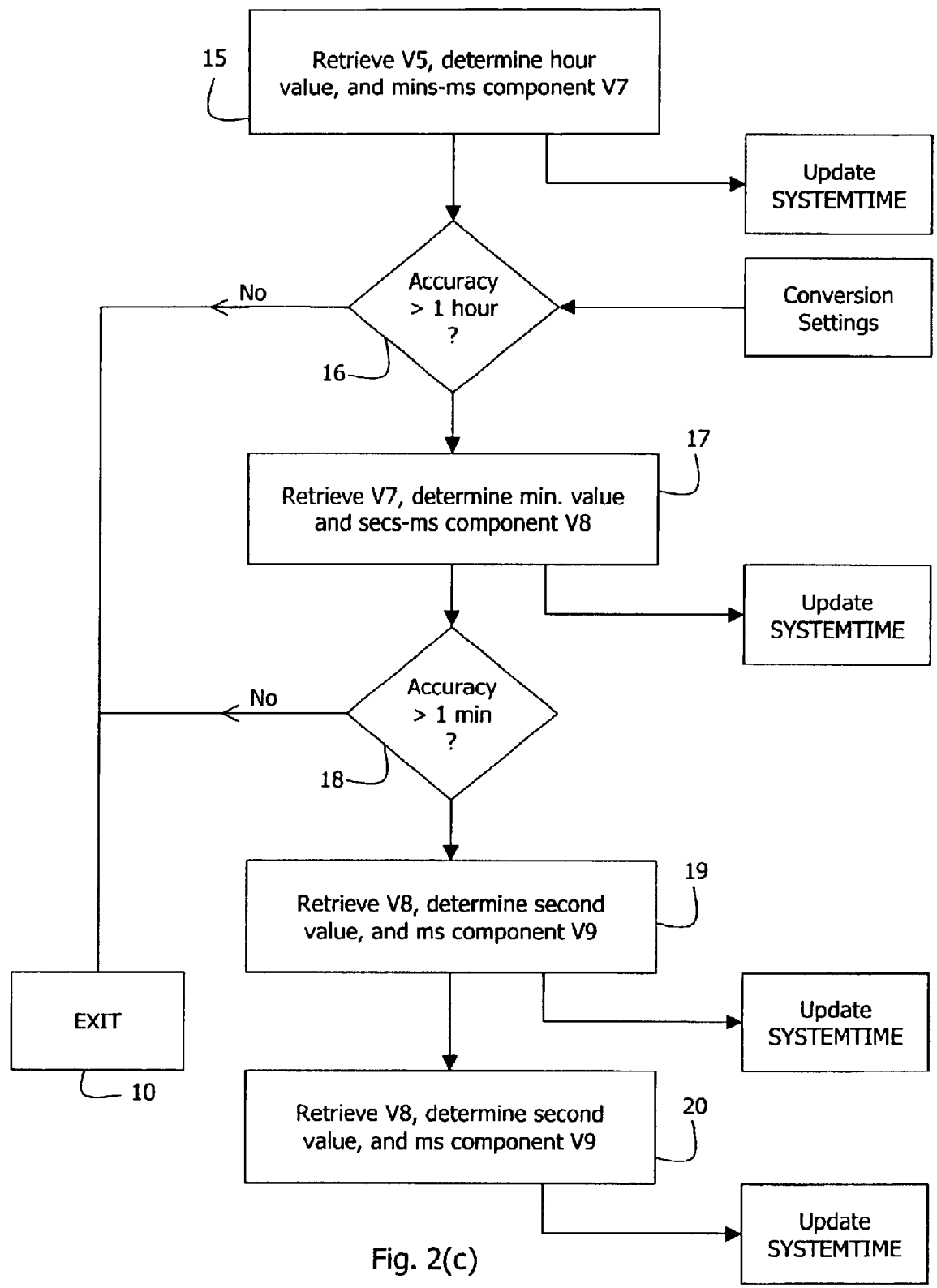

Referring to FIG. 1 a process data capture system comprises n sensors S1 . . . Sn mounted in a pharmaceutical production line. The sensors measure parameters such as vessel pressures and temperatures, pump speeds, and valve on/off status values. This process data is captured by a computer C which appends a FILETIME universal-format time stamp to each process data value.

Operating as a client, the computer C uploads records, each containing a process data value and a FILETIME time stamp to a server S. The server S writes these records, and records from other client computers, to a persistent database DB. Because an absolute-format time stamp is used the data capture is very concise, which is advantageous for high-frequency data capture scenarios. It is also important for accuracy in highly regulated manufacturing environments, such as the pharmaceutical industry.

At a later time, the server S retrieves selected records and generates output reports for viewing by operators. In doing so it converts the time stamp to a SYSTEMTIME "granular" representation, which is easily understood by humans. This format is used for routing reports to workstations W/S on a local area network LAN. This format is also used for data processing in general by the server S.

The process for conversion between FILETIME and SYSTEMTIME uses two optimisation features, as follows:

(a) It determines the date range most likely to be encountered (i.e. dates in and around the year 2002CE). It is possible to use a lookup table to determine the date component of the time, without intensive processing operations. Also, the table may be of a relatively small size. This optimisation technique is referred to as table-based date determination. The date range from 1970 to 2038 inclusive is encoded in the look up table.

(b) For converting from FILETIME to SYSTEMTIME, the process is frequently not interested in all fields of the latter, and the granularity of the conversion is determined by the application based on the context in which the data is being used. For example, for sorting purposes, it may only be necessary to determine the year and month to which a FILETIME belongs. This optimisation technique is referred to as context-dependent partial conversion.

Table-based date determination has an important benefit because dates can be represented by a 32 bit value rather than 64 bits, and thus operations on these 32 bits can be executed very efficiently.

The following sets out the conversion process in detail.

Steps 1–3. The 64-bit FILETIME value (V1) is compared with the start and end of the optimised date range for which a lookup table has been calculated. If it is found to be outside the optimised range (i.e. it has a value which places it before 1st Jan. 1970 or after 1st Jan. 2038) the prior art Win32™ function is invoked to perform the conversion and this procedure exits.

Step 4. By subtracting the 64-bit FILETIME value for 1 Jan. 1970, the 64-bit FILETIME value V1 is normalised with respect to the optimised range (V2).

Step 5. The resulting normalised 64-bit value V2 is divided by 10000. The resulting 64-bit quotient (V3) represents the number of milliseconds since 1st Jan. 1970. The remainder of this division is discarded, as it cannot be represented in a SYSTEMTIME structure (it represents the time component of the FILETIME less than 1 millisecond).

Step 6. The 64-bit count of milliseconds since 1st Jan. 1970 (V3) is divided by 86400000. The resulting 32-bit quotient (V4) represents the number of days since 1 Jan. 1970. The 32-bit remainder of this division (V5) represents the hours/minutes/seconds/milliseconds component of the original FILETIME.

Step 7. The 32-bit count of days since 1 Jan. 1970 (V4) acts as an index to a pre-calculated in-memory lookup array of 16-bit values. Each entry in the array represents the date of the corresponding array index. Thus from the lookup array a single 16-bit value is obtained (V6) corresponding to the date of the original FILETIME.

Step 8. The normalised year is extracted from bits 9–15 of the 16-bit value V6. 1970 is added to this value to obtain the actual Gregorian year of the original FILETIME, and the resulting value is stored in the wYear field of the SYSTEMTIME structure.

Steps 9 & 10. The conversion requirements are examined to determine if the application requires conversion accuracy greater than year. If not, the procedure is complete and exits.

Step 11. The month is extracted from bits 5–8 of the 16-bit value V6, and the resulting value is stored in the wMonth field of the SYSTEMTIME structure.

Steps 12, 10. The conversion requirements are examined to determine if the application requires conversion accuracy greater than month. If not, the procedure is complete and exits.

Step 13. The day is extracted from bits 0–4 of the 16-bit value V6, and the resulting value is stored in the wDay field of the SYSTEMTIME structure.

Steps. 14, 10. The conversion requirements are examined to determine if the application requires conversion accuracy greater than day. If not, the procedure is complete and exits.

Step 15. The 32-bit time component in milliseconds (V5) is divided by 3600000. The resulting 32-bit quotient represents the time in hours and this value is stored in the wHour field of the SYSTEMTIME structure. The 32-bit remainder of this division (V7) represents the minutes/seconds/milliseconds component of the original FILETIME, expressed in milliseconds.

Steps 16, 10. The conversion requirements are examined to determine if the application requires conversion accuracy greater than hour. If not, the procedure is complete and exits.

Step 17. The 32-bit minutes/seconds/milliseconds component (V7) is divided by 60000. The resulting 32-bit quotient represents the time in minutes and this value is stored in the wMinute field of the SYSTEMTIME structure. The 32-bit remainder of this division (V8) represents the seconds/milliseconds component of the original FILETIME, expressed in milliseconds.

Steps 18, 10. The conversion requirements are examined to determine if the application requires conversion accuracy greater than minute. If not, the procedure is complete and exits.

Step 19. The 32-bit seconds/milliseconds component V8 is divided by 1000. The resulting 32-bit quotient represents the time in seconds and this value is stored in the wSecond field of the SYSTEMTIME structure. The 32-bit remainder of this division (V9) represents the milliseconds component of the original FILETIME and is stored in the wMilliseconds field of the SYSTEMTIME structure.

Step 20. The 32-bit count of days since 1st Jan. 1970 (V4) has 4 added to it, and the result is divided by 7. The remainder resulting from this division represents the day-of-the-week of the original FILETIME (where 0=Sun, 1=Mon, etc.) and is stored in the wDayOfWeek field of the SYSTEMTIME structure.

Tests

Tests were performed over 1,000,000 iterations and the average of each run taken. Times are in nanoseconds.

| Test #1 -- converting all levels | |
|---|---|
| Prior Art process: | 1562 ns |
| Invention process: | 610 ns |
| Time reduction: | 61% |
| Speedup: | 256% |
| Test #2 -- converting to minute level | |
| Prior Art process: | 1563 ns |
| Invention process: | 453 ns |
| Time reduction: | 71% |
| Speedup: | 345% |
| Test #3 -- converting to hour level | |
| Prior Art process: | 1562 ns |
| Invention process: | 375 ns |
| Time reduction: | 76% |
| Speedup: | 417% |
| Test #4 -- converting to day level | |
| Prior Art process: | 1562 ns |
| Invention process: | 313 ns |
| Time reduction: | 80% |
| Speedup: | 499% |
| Test #5 -- converting to month level | |
| Prior Art process: | 1563 ns |
| Invention process: | 312 ns |
| Time reduction: | 80% |
| Speedup: | 501% |
| Test #6 -- converting to year level | |
| Prior Art process: | 1562 ns |
| Invention process: | 297 ns |
| Time reduction: | 81% |
| Speedup: | 526% |

It will be appreciated that the invention provides very effective and efficient conversion to the required format with minimum processor execution time. This is particularly advantageous where near real-time reporting is required and/or where the volume of process data is great. For example, a typical chemical production line generates many megabytes of process data per hour. While the invention has been described for use with a FILETIME input and a SYSTEMTIME output format any other similar types of format may be used.

The invention is not limited to the embodiments described but may be varied in construction and detail.

What is claimed is:

1. A data processing method carried out by a data processor connected to a memory, the method comprising the steps of:
   (a) receiving an input time value represented in an absolute format,
   (b) processing the input value to determine an index for a look-up table comprising entries of date or time period values,
   (c) retrieving from the look-up table a date or time period value corresponding to the index, and
   (d) determining from said period value an output value being a granular representation of the input value.

2. The method as claimed in claim 1, wherein the step (b) comprises generating a value for the number of periods elapsed since a start time, and using this value as the index, and wherein said index value is determined by,
   (b1) determining an initial value for the number of low-granularity periods elapsed since the start time, and
   (b2) dividing said initial value to determine a number of higher-granularity periods elapsed since the start time.

3. The method as claimed in claim 2, wherein the higher-granularity periods are days.

4. The method as claimed in claim 2, wherein the initial value represents the numbers of milliseconds elapsed since the start time.

5. The method as claimed in claim 1, wherein the method normalises the input value to the start time of the optimised range before performing the step (b).

6. The method as claimed in claim 1, wherein the period value retrieved from the look-up table is a calendar date.

7. The method as claimed in claim 1, wherein step (d) is repeated for each of a succession of decreasing granular values until a granular representation requirement is met.

8. The method as claimed in claim 7, wherein the potential successive granular values are year, month, day, hour, minutes, seconds, and milliseconds.

9. The method as claimed in claim 1, comprising the further steps of capturing process data, writing a record containing the process data and a time stamp in a universal format to a database, subsequently retrieving the record, and performing steps (a) to (d) to provide a granular-representation output value time stamp in which the universal format time stamp is the input value for the steps (a) to (d).

10. The method as claimed in claim 9, wherein the method comprises the further steps of processing the output value time stamp to generate a process report.

11. The method as claimed in claim 9, wherein the process data is captured from a manufacturing production line.

12. A data processing system comprising means for performing the method of claim 1.

13. A process data capture system comprising sensors for capturing process data, and a processor comprising means for performing the steps of claim 1.

14. A computer program product comprising software code for performing the method of claim 1 when executing on a digital computer.

15. A data processing method carried out by a data processor connected to a memory, the method comprising the steps of:
   (a) receiving an input time value represented in an absolute format,
   (b) processing the input value to determine an index for a look-up table comprising entries of date or time period values by generating a value for the number of periods elapsed since a start time, and using the value as the index,
   (c) retrieving from the look-up table a date or time period value corresponding to the index, and
   (d) determining from said period value an output value being a granular representation of the input value and the look-up table entries spanning an optimised subset of the complete range of the absolute format, and the method being terminated before processing the input value if the input value falls outside of the optimised range.

* * * * *